United States Patent [19]
Konno et al.

[11] Patent Number: 5,633,849
[45] Date of Patent: May 27, 1997

[54] DISK DRIVER HAVING A DUST PROOF REAR COVER FITTED ON A REAR WALL OF A FRAME UNIT

[75] Inventors: Makoto Konno; Hisateru Komatsu; Takashi Watanabe, all of Tendou, Japan

[73] Assignee: Mitsumi Electric Co., Ltd., Tokyo, Japan

[21] Appl. No.: 382,925

[22] Filed: Feb. 3, 1995

[30] Foreign Application Priority Data

Feb. 8, 1994 [JP] Japan .................................. 6-014685

[51] Int. Cl.$^6$ .................................................. G11B 33/14
[52] U.S. Cl. .................................................. 369/75.1
[58] Field of Search ................................ 369/75.1, 75.2, 369/77.2; 360/97.02; 361/685–686, 692–693, 748, 752–753; 439/271, 278, 282

[56] References Cited

U.S. PATENT DOCUMENTS

5,086,422  2/1992  Hagiya et al. .................... 360/97.02
5,349,483  9/1994  Tsai ................................. 369/75.1

*Primary Examiner*—Stuart S. Levy
*Assistant Examiner*—George J. Letscher
*Attorney, Agent, or Firm*—Frishauf, Holtz, Goodman, Langer & Chick

[57] ABSTRACT

In a disk drive having a frame unit (63) in which a rear wall (81) is integrally formed with a bottom plate (63a) by press work such as bending, punching or the like, opening portions (53, 55, 57, 59) are inevitably formed as a designing requirement to form fixing members for fixing a circuit board or to prevent contact owing to the retreat of a carriage assembly (67) at the time of punching or press work of the rear wall (81) of the frame unit (63). To provide a disk drive having high reliability by preventing dust from entering into the disk drive from the opening portions (53, 55, 57, 59) and by preventing destruction of data on a disk owing to pressing of dust onto the disk by a recording and reproducing head, rear cover (83) is mounted on the rear wall (81) for closing the opening portions (53, 55, 57, 59).

10 Claims, 6 Drawing Sheets

DISK DRIVER HAVING A DUST PROOF REAR COVER FITTED ON A REAR WALL OF A FRAME UNIT

BACKGROUND OF THE INVENTION

The present invention relates to a disk drive for recording information on a magnetic disk or an optical disk, and specifically, to a dust proof structure for such a disk drive.

Conventionally, disk drive are formed by enclosing with a cover a main body of a disk drive mechanism including an information recording disk on which information is recorded or from which the information is reproduced.

The main body of the disk drive has a frame unit on which parts are mounted for receiving the information recording disk.

Referring to the magnetic disk, the frame unit has a box form comprising a bottom plate, right and left side walls and a rear wall which are formed in one body from the same one plate. The rear portion extending from the rear wall of the frame unit is covered by a rear plate. In the frame unit, there is provided a disk holder unit for receiving the information recording disk. A recording and reproducing head for recording and reproducing information on and from the disk is provided at one end of the holder unit and the vicinity of one end of the frame unit so as to be able to contact or closely access the disk received therein. The recording and reproducing head and some other parts are mounted on a carriage assembly which is a mechanism for moving the head close to or away from the disk. Further, at the rear part of the frame unit, there is provided a stepping motor having a leadscrew shaft for moving the recording and reproducing head in the radial direction of the disk. The stepping motor is mounted outside of the rear wall of the frame unit and the shaft of the leadscrew shaft extended through the rear wall into the frame unit.

A drive assembly for rotating the disk received in the holder unit is provided beneath the holder unit. The drive assembly is introduced through the bottom wall via a rotor of a D.C. motor integrally mounted on a print circuit board provided outside of the bottom wall of the frame unit.

In the mean time, in the conventional disk drive, a bezel is provided at the front part of the frame unit the side walls of which are enveloped by the cover. On the rear wall, however, there are formed holes for mounting or connecting of parts and unavoidable spaces owing to press works. For example, a pair of fixing members for supporting the print circuit board for driving the stepping motor at outside part of the bottom wall of the frame unit are formed by punching the both sides of the rear wall. At the back side of the disk drive, the rear plate is provided for covering the upper surface of the portion backside of the rear wall.

At the rear part of the print circuit board for driving the stepping motor and the recording and reproducing head, on the other hand, a connector for connecting the circuit to outside devices is provided. Accordingly, an outer case enclosing the frame unit necessarily has an opening at its rear part for connection with the connector. There has been, thus, a problem that dust comes into the frame unit through the spaces or holes on the rear wall of the frame unit as described above. In particular, there are the carriage assembly having the recording and reproducing head or other precision parts at the vicinity of the rear wall of the frame unit. The carriage assembly and precision parts, therefore, tend to operate erroneously owing to the dust. There is another problem that data recorded on the disk are destroyed because the recording and reproducing head presses the dust on the disk.

SUMMARY OF THE INVENTION

It is an object of the present invention to provide a disk drive having high reliability by preventing an erroneous operation or data destruction of the disk caused by introduction of dust from the reap wall of the frame unit.

According to the present invention, there is provided a disk drive which comprises a frame unit having a rear wall formed integrally with a bottom plate made by press work from a plate, the rear wall having at least one opening portion consisting of a hole or gap space, and a fixing member rearwardly extending from an edge of the opening portion and fixing a circuit board thereby. In the present invention, the disk drive further comprises a disk holder unit for receiving a disk on and from which information is recorded and reproduced in the frame unit and driving it, a carriage assembly including a recording and reproducing head for recording and reproducing information on and from the disk, the carriage being mounted at the rear wall of the frame unit and being driven forward and backward, a stepping motor mounted on the rear wall for driving the carriage assembly, and the circuit board fixed by the fixing member to be extended from under the bottom plate and rearwardly beyond the rear wall and having a circuit for driving the recording and reproducing head and the stepping motor and an electrical connector for connecting the circuit with external devices connected thereon. In the present invention, the disk drive is characterized in that the rear wall has a rear cover mounted for closing the opening portion.

In an aspect of the present invention, here, the rear wall is provided with of a first space formed at one end of the rear wall by forming the rear wall with the fixing member by punching and a second space formed at the other end of the rear wall, and the rear cover having first and second corner portions which close the first and second spaces, respectively. Preferably, the first and second corner portions oppositely project frontwardly and rearwardly from the surface of the rear cover, respectively.

In another aspect of the present invention, further, the rear cover has an inner flat portion and an outer flat portion for holding the rear wall therebetween when the rear cover is mounted on the rear wall. Preferably, the rear wall has a hole at the center thereof as the opening portion and the fixing member is formed by punching the hole, and that the rear cover has a rear flat portion for closing the hole and a rear projecting portion for covering the fixing member when the rear cover is mounted on the rear wall.

In still another aspect of the present invention, the rear wall has a wall engaging member of a notch or a hole, and the rear cover has a cover engaging member for engaging with the wall engaging member at the time the cover is mounted on the rear wall.

In yet another aspect of the present invention, the rear cover has a contact portion having an uneven surface which is corresponding to an uneven surface of the frame unit formed by processing.

In a further aspect of the present invention, the rear cover has a hole for enclosing the periphery of the stepping motor and a projecting portion formed at its lower end so as to follow the outlines of the circuit board and to separate the fixing member of the opening portion and the connector.

In a still further aspect of the present invention, the rear cover is removably mounted on the rear wall.

In a yet further aspect of the present invention, the rear cover is made of synthetic resin. Preferably, the synthetic resin is acronylonitrile-butadien-styrene (ABS) resin.

DESCRIPTION OF THE PREFERRED EMBODIMENT

Figure 1:
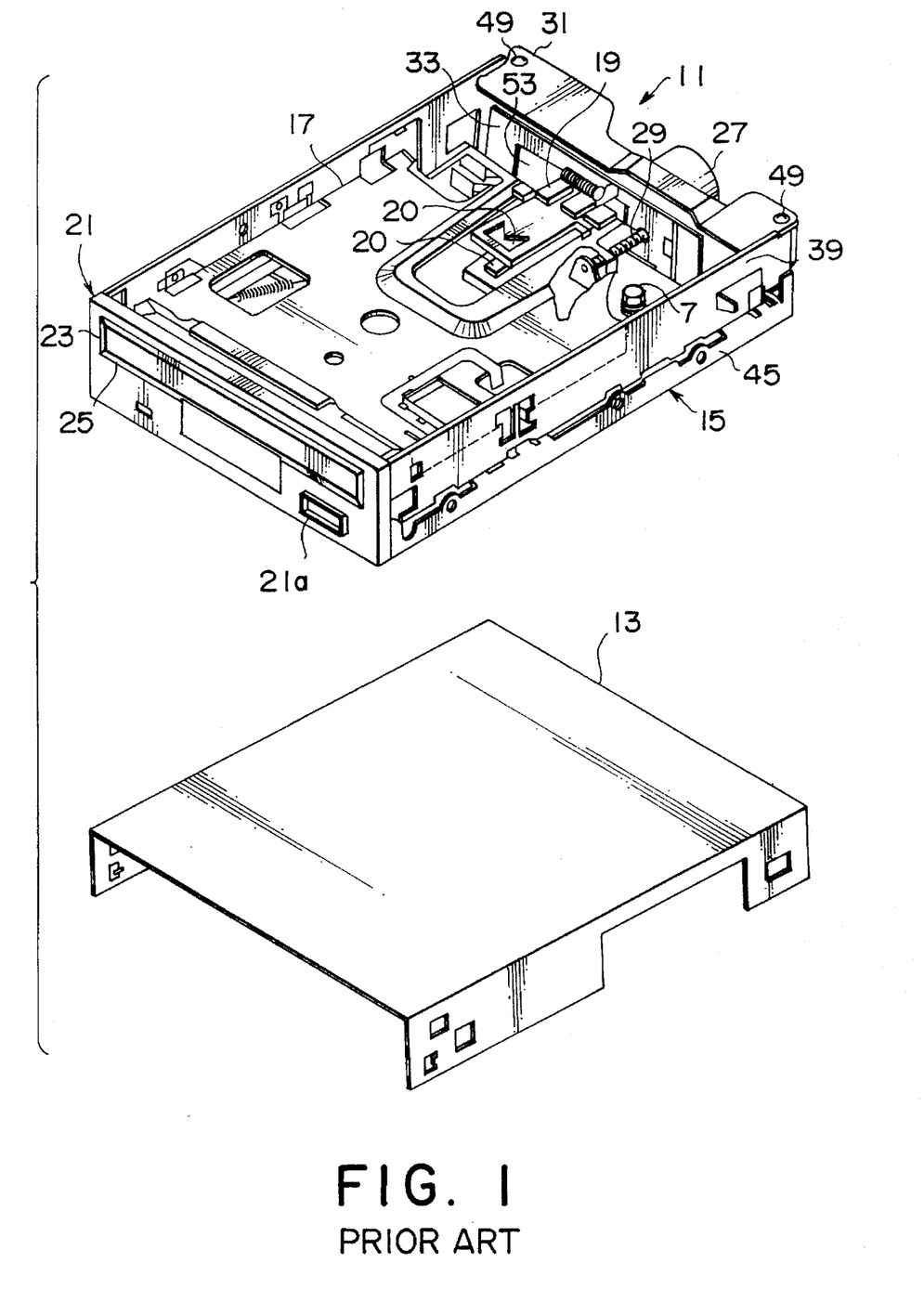
FIG. 1 is a perspective view showing a structure of a prior art disk drive.
Figure 2:
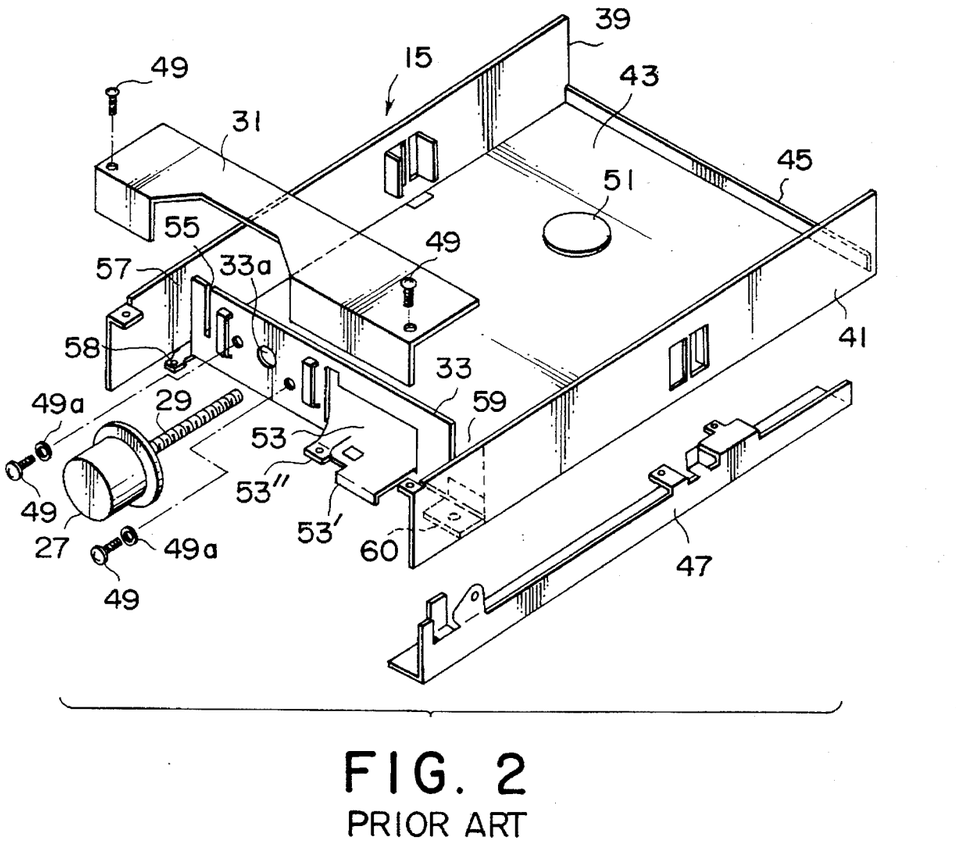
FIG. 2 is a perspective view mainly showing a frame unit of the disk drive shown in FIG. 1.
Figure 3:
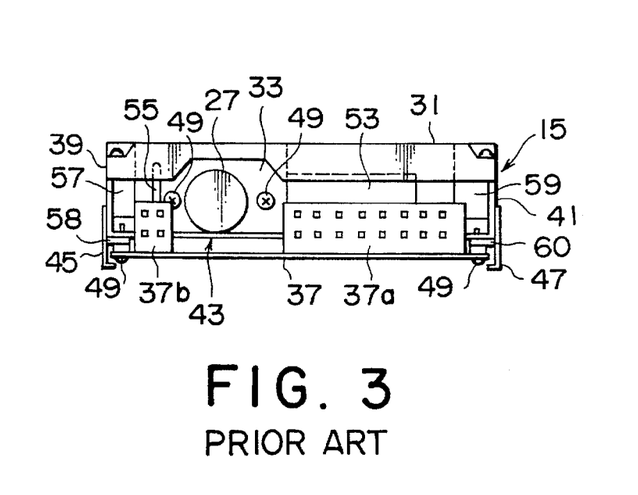
FIG. 3 is a rear view of the disk drive shown in FIG. 1.

A prior art disk drive is described with reference to FIG. 1 to FIG. 3 for a better understanding of the present invention before the description of the preferred embodiment of the present invention is made. As shown in FIG. 1 to FIG. 3, the prior art disk drive comprises a main body 11 of the disk drive and a cover 13 for enclosing the main body 11 of the disk drive. The main body 11 of the disk drive has a frame unit 15 consisting of a frame on which parts are mounted. The frame unit 15 includes within it a disk holder unit 17 for receiving a disk. The disk holder unit 17 has a carriage assembly 19 at its rear end. The carriage assembly 19 has two pieces of plates for holding the received disk and on opposite surfaces of which there are provided a pair of heads 20, 20 for recording and reproducing information on the disk. The frame unit 15 has a front bezel 21 at its front side. The front bezel 21 has an opening 23 for taking in and out the disk and a door 25 for opening and closing the opening 23. Here, the reference 21a shows an eject button connected to an eject lever for taking out the disk.

A stepping motor 27 having a leadscrew shaft 29 for driving the recording and reproducing head is provided at the rear part of the frame unit 15. Further, a rear plate 31 is provided for covering the rear portion of a rear wall 33 of the frame unit 15. The disk is driven by a drive assembly introduced into a bottom side. A main circuit board 37 and a subsidiary circuit board which is not shown are provided beneath the rear portion of the frame unit 15 as described later in detail with reference to FIG. 3.

As best shown in FIG. 2, the frame unit 15 has side walls 39 and 41 provided on the both sides of a bottom plate 43. The side walls 39 and 41 are connected to the bottom plate 43 at their lower portions. And the side walls 39 and 41 and bottom plate 43 are connected by the rear wall 33 at their side portions.

The frame unit 15 is formed in one body in the bottom of which there is formed a hole for mounting a rotor for rotatingly driving the disk and for connecting to a motor provided on the subsidiary circuit board (not shown). At the front portion, a wall portion 45 is formed projecting from the upper portion of the bottom plate 43 for mounting the bezel 21. On both sides of rear wall 33 of the frame unit 15, holes 57 and 59 are inevitably formed by being formed in one body by press work. Cut flat portions 58, 60 which are cut apart when the holes 57 and 59 are made from fixing flat portions. At the central part of one end of inner rear wall, a recording and reproducing head portion is mounted on the carriage assembly which are driven back and forward by the stepping motor 27. The recording and reproducing head portion and the carriage assembly are placed at a position close to the rear wall 33 which is a waiting position before or when the floppy disk is inserted. To make the disk drive small, a hole portion 53 is provided on the rear wall to prevent the carriage assembly from contacting with the rear wall when the assembly moves toward the rear wall. By punching hole portion 53 at the time of forming the frame, punched portion 53', 53" forms fixing portion for fixing a main circuit board 37. Further, a hole may be formed at the portion corresponding to a corner on a border line between the rear wall 33 and the bottom plate 43 for easily bending the frame. Further, a hole 33a is formed on the rear wall 33 of the frame unit 15 for introducing the stepping motor 27 for driving the head assembly and the leadscrew shaft 29 of the stepping motor 27. One end of a connector projecting upward from the circuit board and electronic parts (resistors, capacitors and so on) are provided at the vicinity of the rear wall 33.

The lower side portion is provided with a subsidiary circuit board formed in one body with a rotor driving motor and with a cover for the motor. Both sides are wrapped by a cover such as 13. Front side is covered by the bezel 21. However, because the connector connected to the main circuit board and stepping motor 27 are mounted on the rear wall 33, the rear side must be kept open to radiate the heat generated by the stepping motor 27 and to connect the connector 37a, 37b to outer devices.

As best shown in FIG. 3, the frame unit 15 has lower plates 45 and 47 which are provided at the lower part of the both sides of the frame unit 15 using a mechanical fixing such as engagement or the like. These lower plates 45 and 47 play a roll of amounting the disk drive into an electronic equipment which is not shown. Between the left and the right lower plates 45 and 47, there is provided main circuit board 37 at the rear part and subsidiary circuit board at forward part. Main circuit board 37 has connectors 37a and 37b which are projecting from one end of the board at its one surface.

As described above, at the rear side of the rear wall, the rear plate 31 is provided fixed on frame unit 15 by a screw 49 for covering the rear part of frame unit 15. Here, the reference number 51 is a disk assembly connected with a rotor of a motor (not shown) for driving a disk which is provided beneath the frame unit 15.

The stepping motor 27 is mounted on the outside of rear wall 33 by a screw 49 which is the same one as above screw 49 through a washer 49a. A leadscrew shaft 29 of stepping motor 27 extends to inside of frame unit 15 through rear wall 33. At rear wall 33, there is formed a hole 53 or gap spaces 55, 57 and 59. The hole 53 is provided for mounting parts on the frame unit 15 or for connecting parts to other devices. The gap spaces 53, 57 and 59 are formed by press work of frame unit 15 and are forming at the same time fixing members 53', 53", 58 and 60 for fixing the circuit board.

The conventional disk drive 11 has the rear plate 31 at its rear part which covers upper part of the drive. In spite of the fact, there are on rear wall 33 inevitable gap spaces 55, 57 and 59 of through hole 51 which are formed by punching the frame unit 15 at both sides of the reap portion at the same time when the rear wall is formed. Those gap space or the like are also formed by forming the fixing member for fixing main circuit board having a connector on it at the rear part beneath the frame unit 15 and thereby raising a problem that dust is introduced through these gap spaces and hole. This problem may be resolved by covering the rear part of the frame unit. In that case, however, connection to the connector can not be made by being interfered by the cover since there is provided the connector 37a for connecting to the outside electronic equipments at the portion backward of the rear wall which is an upper and rear part of the main circuit board 37. It is, therefore, impossible to provide a cover at the rear part of the frame unit 15. It is, however, possible that dust introduced from the opening causes erroneous operation of the carriage assembly having a recording and reproducing head 19 or precision electronic parts which are mounted at the vicinity of inside rear wall 33 determined by the design plan. Further, there is also a problem that data stored on the disk is destroyed by the fact that the recording and reproducing head 20, 20 of the carriage assembly 19 put the dust between the head and the disk when the opening is kept open. Further, there is a problem that the disk driver operates erroneously or does not operate at all by the fact that electronic parts projecting from the main circuit board 37 at the vicinity of the rear wall 33 contact with the rear wall 33.

The preferred embodiment of the present invention is now described with reference to FIGS. 4 to 10.

Figure 4:
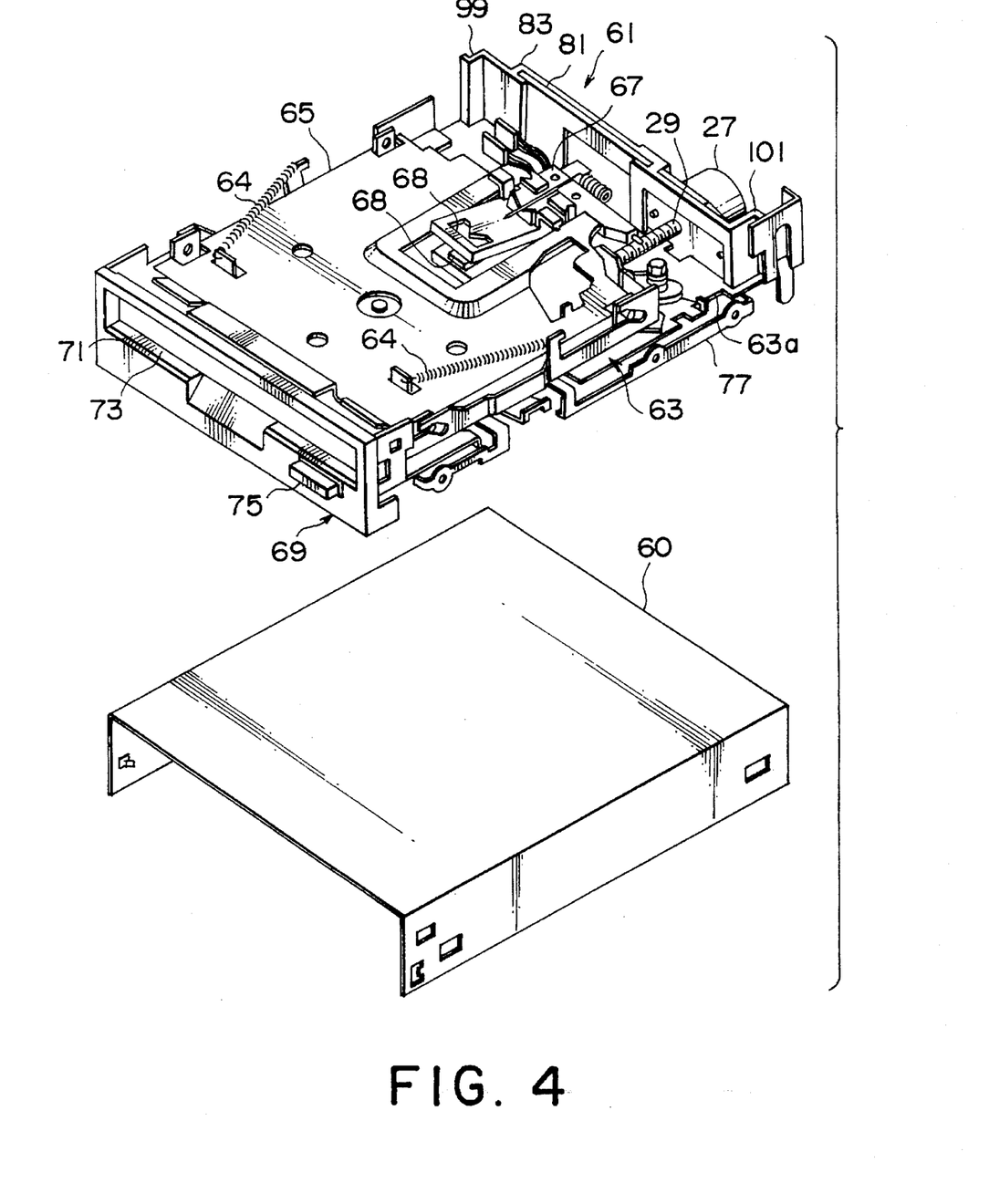
FIG. 4 is a perspective view showing an example of a disk drive according to the present invention.
Figure 5:
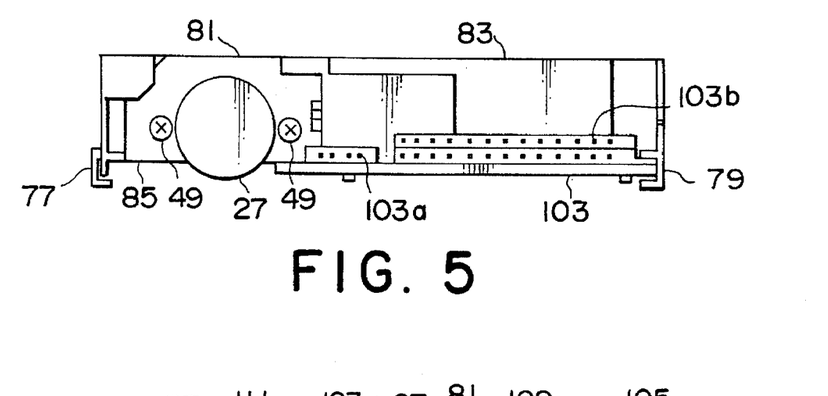
FIG. 5 is a rear view of the disk drive shown in FIG. 4.

As shown in FIGS. 4 and 5, a disk drive body 61 covered with a cover 60 includes frame unit 63 which provides a frame for mounting each part of a disk driver. The frame unit 63 has on it a disk holder unit 65 for receiving a disk. The disk holder unit 65 is formed in a box like shape by superposing an upper plate and an under plate each of which has bent ends facing oppositely with each other. The upper plate is pulled obliquely upward by spring members 64 and 64. The disk holder unit 65 has a carriage assembly 67 at a portion close to its one end. The carriage assembly 67 has two pieces of plates for holding heads 68, 68 on their opposite surfaces for recording and reproducing information on the disk received in disk holder unit 65.

Further, in the embodiment shown in FIG. 4, frame unit 63 has a front bezel 69 at its front side. Front bezel 69 has an opening portion 71 for taking in and out the disk and a door 73 for opening and closing the opening portion 71. The door 73 opens only at the time when the disk is taking in and out. An eject button 75 is projectingly provided which is movable back and forth. The eject button 75 cooperates with an eject assembly (not shown) and an eject lever provided beneath the disk holder unit 65 to push up an upper plate of the disk holder unit 65 and ejects the disk received in the disk holder unit 65 toward the front side. At the rear part of the frame unit 63, a stepping motor 27 is provided having a leadscrew shaft 29 for moving back and forth the carriage assembly 67 together with recording and reproducing heads 68, 68. The recording and reproducing heads 68, 68 are engaged with a projection at one end of the carriage assembly 67. A screw groove is cut in the projection through which the carriage assembly 67 is moved.

Figure 6:
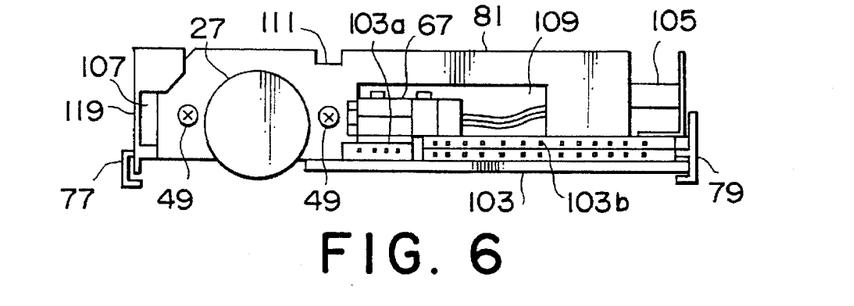
FIG. 6 is a rear view showing a state of the disk drive shown in FIG. 4 in which a rear cover is not mounted yet.

In the embodiment shown in FIGS. 4, 5, 6 and 9, the frame unit 63 of the disk drive body 61 is different from the prior one in that it does not have a side wall portion and that lower plates 77, 79 for fixing the drive to electronic devices are formed in one body with a bottom plate 63a at both sides below the frame unit 63. Further, on a rear wall 81, a rear cover 83 is provided which is not provided in the prior drive. As best shown in FIGS. 5 and 6, a main circuit board 103 for driving the recording and reproducing head of the carriage assembly 67 and the stepping motor 27 having a connector on it and other parts are provided beneath the rear portion of the disk drive. The stepping motor 27 is provided on the rear wall 81 on which the rear cover 83 is provided.

Figure 7A:
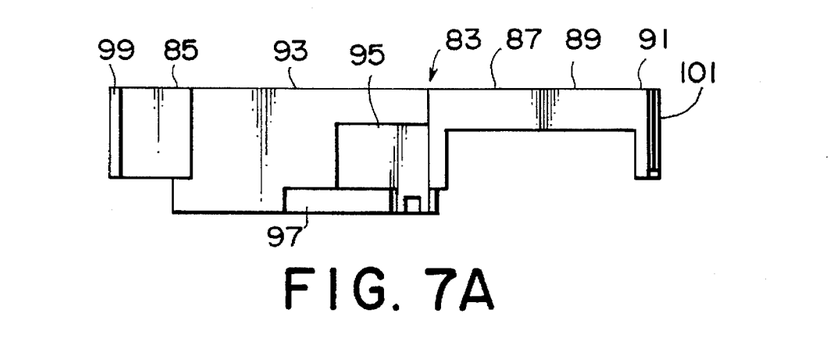
FIG. 7A is a plane view of the rear cover described above with respect to FIG. 4.
Figure 7B:
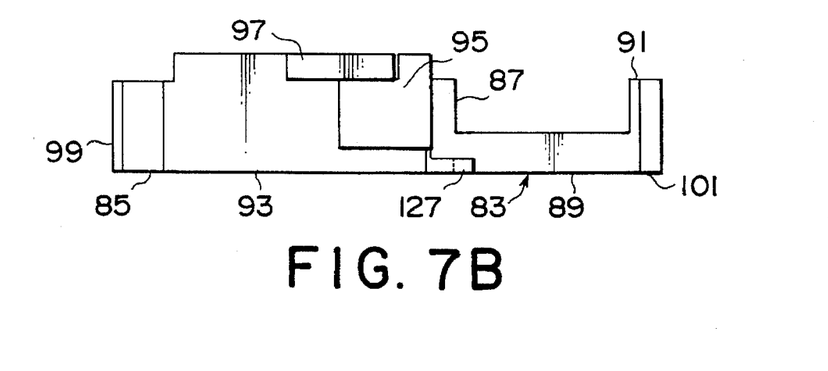
FIG. 7B is a rear view of the rear cover described above with respect to FIG. 4.

FIG. 7A is a plane view of the rear cover 83 and FIG. 7B is a rear view of it. In the description hereinafter, the side in which the rear cover 83 is fixed on the rear wall 81 facing the front side is called as a front side. On the other hand, the side in which rear cover 83 is fixed on the rear wall 81 facing the rear side is called as a rear side. Rear cover 83 is made of ABS resin. Rear cover 83 is, however, not limited to this material and may be a press formed material.

The rear cover 83, further, has a first inner flat portion 85 on the left side and a series of second to fourth inner flat portions 87, 89 and 91. These first to fourth inner flat portions 85, 87, 89 and 91 are provided on the same plane. The rear cover 83 has an outer flat portion 93 at a portion apart from first to fourth inner flat portions 85, 87, 89 and 91 backward by a distance equal to the thickness of the rear wall 81. A backward flat portion 95 is formed with a step at the portion rearer than backward flat portion 95. Further, a projecting portion 97 is formed at the portion rearer than backward flat portion 95. On both sides of the rear cover 83, first and a second corner forming members 99 and 101 are provided, respectively. The first corner forming members 99 extend forward from one end of first inner flat portion 85 and bend to project outside. The second corner forming members 101 extend forward from one end of first inner flat portion 85 and the side surface and lower surface of the edge portion project outside.

Figure 8:
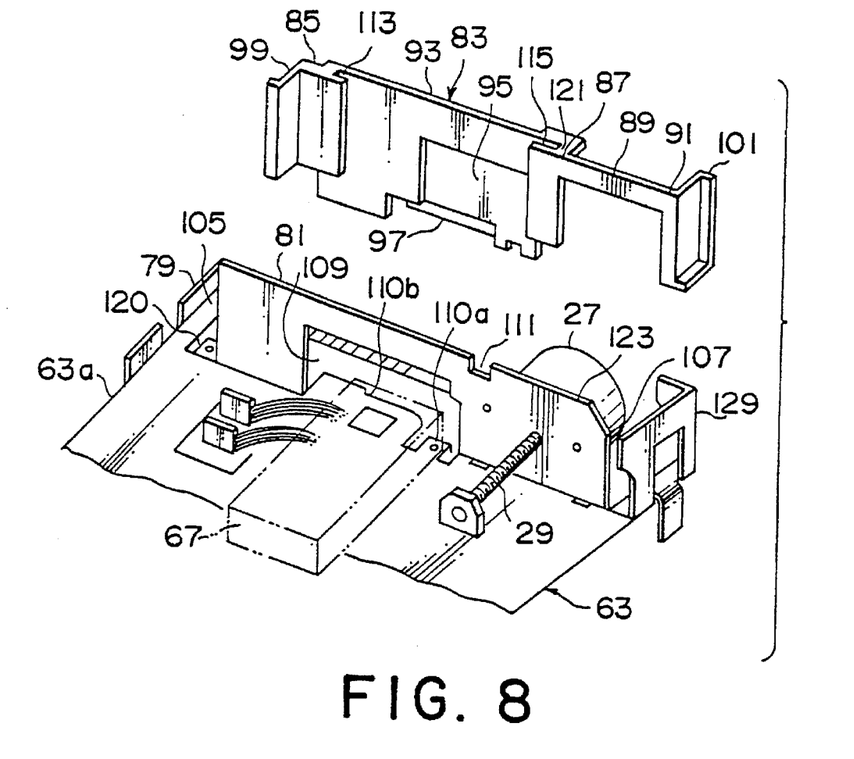
FIG. 8 is a perspective view for showing a mounting action of the rear cover shown in FIG. 5.
Figure 9:
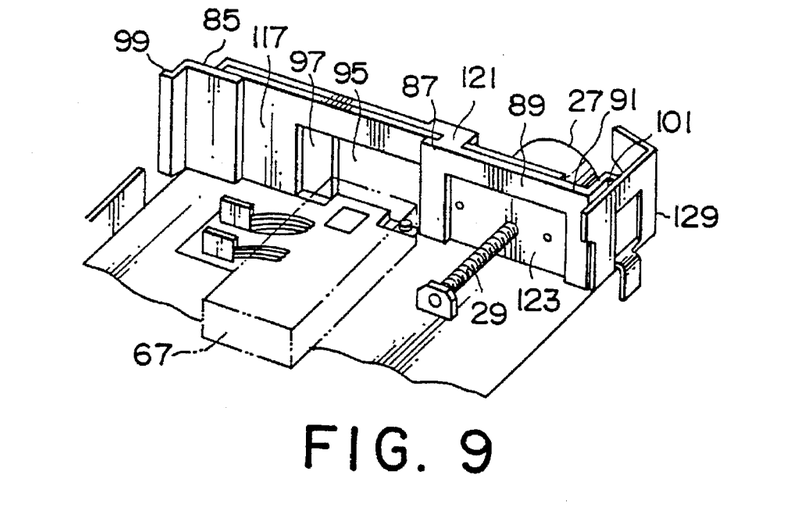
FIG. 9 is a perspective view showing a state of the disk drive shown in FIG. 5 in which a rear cover is mounted.

In FIGS. 8 and 9, the two dot chain line shows the position where the carriage assembly 67 is placed. As best shown in FIGS. 6 and 8, first and second gap spaces 105 and 107 are formed on the rear wall 81 at the time when fixing member 120 or rear frame 79, 119 extending backward from the side walls are formed on both side of the rear wall 81 before the rear cover 83 is mounted on rear wall 81. Further, at the middle part of the rear wall 81, a hole 109 and a notch 111 are formed, respectively, at the time when fixing member 110a, 110b for fixing the main circuit board are formed. Here, grooves 113 and 115 are oppositely formed between connecting points of inner flat portions 89, 91 and outer flat portion 93 with the rear cover 83.

FIG. 9 shows a state where the rear cover 83 is mounted on the rear wall 81 in such manner that end portion of the rear wall 81 is inserted into grooves 113 and 115 of rear cover 83 and that each inner flat portions 85, 87, 89 and 91 is placed in front of the rear wall and that outer flat portion 93 is placed behind the rear wall 81.

FIG. 9 shows a state where the front portions 117 and 123 of the rear wall 81 are exposed to the front side and where the hole 109 is completely closed by the outer flat portion 93 and rear flat portion 95. At the same time, the gap spaces 105 and 107 on both side of the rear wall 81 are closed by first and second corner forming portions 99 and 101, respectively. The inner flat portions 87, 89, and 91 make a hole and are attached to the rear wall around the stepping motor 127 so as to remain the stepping motor in the hole. The rear cover 83 has a contact portion having an uneven surface which corresponds to an uneven surface of the frame unit 63 formed by processing, as shown in FIG. 8. Projecting portion 97 is so formed as to adhere closely to the frame unit 63 and a print circuit board 103 corresponding to the processed shape of frame unit 63 and to the roughness of the surface of the print circuit board 103. An engaging portion 121 being a bridge portion for connecting outer flat portion 93 and inner flat portion 87 is provided in one groove 115 of the rear cover 83. When the rear cover 83 is mounted on the rear wall 81, engaging portion 121 engages with the notch 111 of the rear wall 81 and determines the position of the rear cover 83, thereby preventing the shifting of the rear cover 83 in a direction along the surface of the rear wall 81.

As shown in FIGS. 6 and 8, before the rear cover 83 is mounted, the gap spaces 105 and 107 or hole 109 are present, respectively. After mounted, these gap spaces 105 and 107 or the hole 109 are covered by each portion of the rear cover 83 as shown in FIGS. 5 and 9. In this manner, the rear cover 83 can prevent dust to enter into equipment by being mounted on the rear wall 81 and closing all the gap spaces.

Figure 10A:
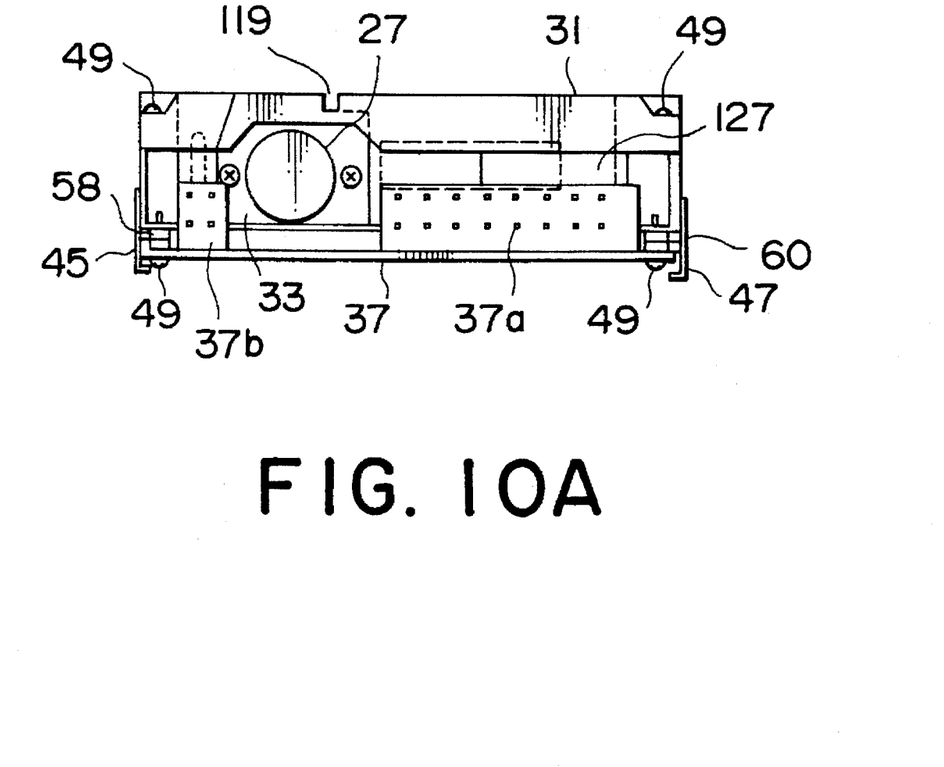
FIG. 10A is a rear view showing another example of a disk drive according to the present invention.
Figure 10B:
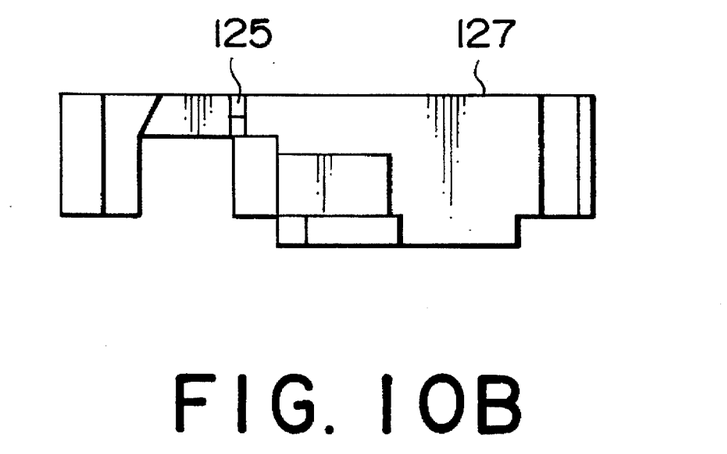
FIG. 10B is a rear view of the rear cover described above with respect to FIG. 10A.

In the next, another embodiment of the present invention is described in reference with FIGS. 10A and 10B. The disk drive shown in FIG. 10A is different from the prior art one shown in FIG. 1 in that a notch 119 is provided on the rear wall 33 and that a rear cover 127 having an engaging portion with the notch 119. The other parts of the disk drive according to another embodiment of the present invention are similar to those of the prior art.

As shown in FIG. 10B, in disk drive body 11, the gap spaces or hole 53, 55, 57 and 59 formed in the rear wall 33 are completely closed by the rear cover 127 which is similar to the rear wall 83 shown in FIGS. 7A and 7B. Here, a rear plate may be mounted after the rear cover 127 is mounted. In that case, design freedom of the rear cover 127 is increased.

As description has been made with reference to embodiments, the frame unit 15, 63 is provided with the rear wall 33 and 81 using a press work. At this time, the holes 53, 109 or the gap spaces 55, 57, 59, 63, 105, and 107 are inevitably formed for the reason of designing to form fixing members 53', 53", 58, 60, 110a, 110b, and 120 for fixing the main circuit board or to prevent the contact owing to the retreat of the carriage assembly 19 and 67.

It is possible to prevent dust from entering into the disk drive and thereby prevent destruction of data of the disk or erroneous operation of recording and reproducing head 20, 68 owing to putting dust between the head and the disk by providing the rear cover 83 and 127 for closing those holes 53, 109 or gap spaces 55, 57, 59, 77, 79, 105, and 107. Further, it is possible to provide a disk drive having high reliability by preventing erroneous operation of the recording and reproducing head 20, 68 or destruction of data of the disk.

What is claimed is:

1. A disk drive comprising:

a frame unit having a rear wall formed integrally with a bottom plate made by press work from a plate, said rear wall having at least one opening portion comprising a hole or gap space, and a fixing member rearwardly extending from an edge of said opening portion for fixing a circuit board thereto, said rear wall having a rear cover mounted thereon for closing said opening portion to the environment;

a disk holder unit for receiving a disk, said disk holder unit being in said frame unit and driving said disk;

a carriage assembly including a recording and reproducing head for recording information on and reproducing information from said disk, said carriage being mounted at said rear wall of said frame unit; and a stepping motor mounted on said rear wall for driving said carriage assembly forward and backward;

said circuit board extending from a position beneath said bottom plate and rearwardly beyond said rear wall, and said circuit board including a circuit for driving said recording and reproducing head and said stepping motor, and an electrical connector for connecting said circuit with external devices;

said rear wall including a wall engaging member, said wall engaging member comprising a notch or a hole; and said rear cover including a cover engaging member for engaging with said wall engaging member when said cover is mounted on said rear wall;

whereby shifting of said rear cover in a direction along a surface of said rear wall is prevented and entry of dust into the equipment is prevented.

2. A disk drive as claimed in claim 1, wherein:

said rear wall includes a first opening formed at one end thereof by forming said rear wall with said fixing member by punching, and a second opening formed at another end of said rear wall; and said rear cover includes first and second corner portions which close said first and second openings to the environment, respectively.

3. A disk, drive as claimed in claim 2, wherein said first and second corner portions oppositely project frontwardly and rearwardly from a surface of said rear cover, respectively.

4. A disk drive as claimed in claim 1, wherein said rear cover includes an inner flat portion and an outer flat portion for holding said rear wall therebetween when said rear cover is mounted on said rear wall.

5. A disk drive as claimed in claim 4, wherein:

said opening portion of said rear wall comprises a hole at a center portion of said rear wall and said fixing member is formed by punching said hole; and said rear cover includes a rear flat portion for closing said hole to the environment and a rear projecting portion for covering said fixing member when said rear cover is mounted on said rear wall.

6. A disk drive as claimed in claim 1, wherein said rear cover includes a contact portion having an uneven surface corresponding to an uneven surface of said frame unit formed by processing.

7. A disk drive as claimed in claim 1, wherein said rear cover includes an opening for enclosing a periphery of said stepping motor, and a projecting portion formed at a lower end of said rear wall corresponding in shape to said circuit board for separating said fixing member and said connector.

8. A disk drive as claimed in claim 1, wherein said rear cover is removably mounted on said rear wall.

9. A disk drive as claimed in claim 1, wherein said rear cover is made of synthetic resin.

10. A disk drive as claimed in claim 9, wherein said synthetic resin comprises acrylonitrile-butadien-styrene resin.

* * * * *